W. S. Mead,
Anti-Friction Roller.

Nº 53,023.  Patented Mar. 6, 1866.

Witnesses.
Andrew De Lacy

Inventor
Wm S Mead

UNITED STATES PATENT OFFICE.

WILLIAM S. MEAD, OF NEW YORK, N. Y.

IMPROVEMENT IN JOURNALS AND BOXES.

Specification forming part of Letters Patent No. 53,023, dated March 6, 1866.

*To all whom it may concern:*

Be it known that I, WILLIAM S. MEAD, of the city, county, and State of New York, have invented certain new and useful Improvements in Journals and Boxes therefor; and I do hereby declare that the following is a full, clear, and exact description thereof, reference being had to the accompanying drawings, making part of this specification, in which—

Figure 2:
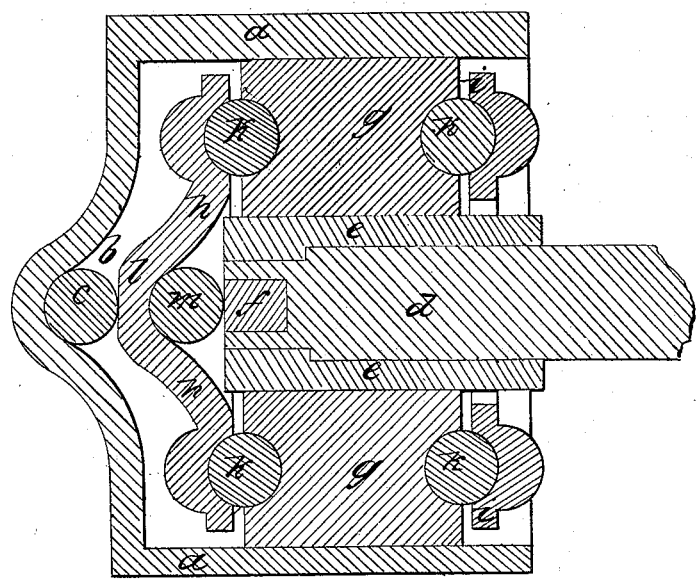
Figure 1:
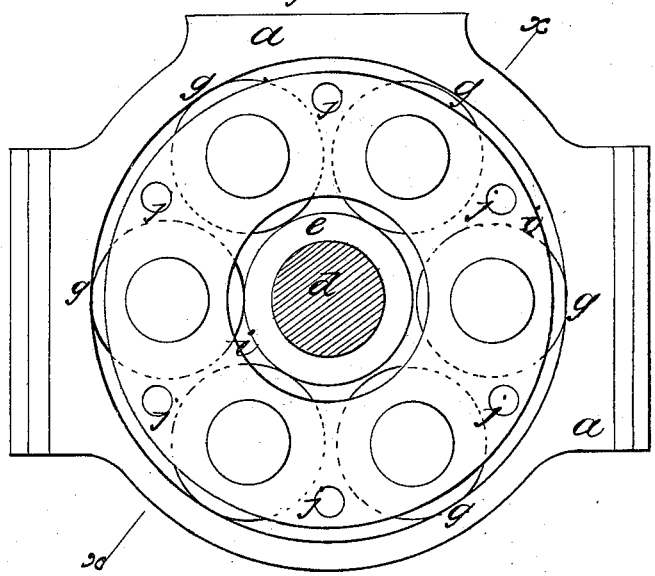

Figure 1 is an end view of the box with the journal in section; Fig. 2, a longitudinal vertical section at the line $x\ x$ of Fig. 1.

The same letters indicate like parts in both figures.

My said invention relates to improvements in the end journals of axles and shafts and to the boxes therefor, with the view to render them more durable and to reduce the friction due to the rotation and to longitudinal thrusts and pressure.

In the accompanying drawings, $a$ represents the box, which is made of cast-iron and of any suitable external form, that represented being suitable for a railroad-car; but any other may be substituted, depending upon the purpose to which my said invention may be applied. The inside of the box is cylindrical and the upper portion thereof cast in a chill. When the direction of the weight or force, as when the boxes sustain the shaft instead of the axle sustaining the boxes, is reversed, the lower instead of the upper half of the inner surface should be chilled; but, if desired, the whole of the inner surface may be chilled. The outer and closed end is formed with a cavity, $b$, in the form of the segment of a hollow sphere, to receive a ball, $c$, and both the cavity and the ball are to be made of chilled cast-iron, for a purpose to be presently described.

The journal $d$ of the axle or shaft is formed to receive a sleeve, $e$, made of chilled cast-iron. The outer end of the journal is made of reduced size and square, and this is fitted to a square hole cast in the end of the sleeve and riveted on the outside. In this way the journal is effectually prevented from turning in the sleeve.

In fitting cast-steel sleeves on journals it has been the practice to secure the two together, to prevent turning, by a radial pin inserted in a hole made in the periphery of the sleeve and extending into the journal; but such method is defective, for the reason that it makes a break in the surface of the sleeve, and the hole for the reception of the pin materially reduces the strength of the journal and sleeve, which defects are effectually avoided by my improved method of connecting the sleeve with the journal, while at the same time I avoid the necessity of drilling a hole in the chilled cast-iron, which, from the extreme hardness of that material, is very difficult to drill.

It will be obvious that, instead of making the hole in the end of the sleeve and the reduced part of the journal which fits into it of a square form, any form other than round and concentric may be substituted, although I prefer the square form.

It will be found best to insert a piece of chilled cast-iron in the end of the journal, as at $f$, to bear against the chilled ball, to be presently described.

The annular space between the inner periphery of the box and the journal is occupied by a series of cylindrical rollers, $g$, made of chilled cast-iron, and these rollers are mounted in a frame consisting of a plate, $h$, and a ring, $i$, connected by rods $j$. The ends of the rollers are cast with cavities in the form of a segment of a sphere, and also chilled, and the inner surface of the plate $h$ and of the ring $i$ are cast with a series of cavities corresponding with those in the ends of the rollers, and chilled-cast-iron balls $k\ k$ are inserted in these cavities before the plate and ring are connected by the rods $j$, so that the balls act as journals to keep the rollers at their proper distances apart, the balls relieving the friction in whatever direction the thrust may come.

The plate $h$ is formed with a concentric projection, $l$, chilled to bear against the chilled ball $c$ in the cavity $b$ of the box $a$, by which the friction due to end-pressure is relieved, and the inside of this plate is formed with a cavity like the cavity in the end of the box, and to receive a chilled-cast-iron ball, $m$, against which the end of the journal bears to resist end-pressure, the ball and the chilled surfaces being for the purpose of reducing the friction and the wear of the parts.

The series of rollers cannot come in contact with one another, as they are maintained at equal distances apart by the chilled balls, which not only act as journal for this purpose, but also present rolling-surfaces to reduce friction due to the end play and pressure.

As the rollers when in proper action simply roll in the box and on the journal, the friction induced has been found to be very slight; but as heretofore made the weight and the shocks or hammer-like actions to which the surfaces are exposed in a very short time cause the surfaces to become flattened and indented. I have discovered, however, that by making these surfaces of chilled cast-iron they will effectually resist the weight and shocks without becoming flattened and indented, and in that way I have overcome one of the most serious objections heretofore experienced in the use of roller-boxes for journals, particularly when applied to the boxes of axles for railroad-cars and locomotives; and by the introduction of chilled-cast-iron balls and sockets as journals simply to keep the rollers from coming in contact with one another and to relieve the friction due to end play and pressure, I successfully avoid the difficulty heretofore experienced in the use of ordinary journals on such rollers for keeping the rollers at a proper relative distance apart, and that is the friction on the shoulders of the journals induced by end thrusts and pressure. This is effectually avoided by the ball-journals; and by the introduction of the chilled balls between the end of the journal and the end plate of the roller-frame, and between the latter and the outer end of the box, I am enabled materially to reduce the friction and wear due to end play and pressure.

What I claim as my invention, and desire to secure by Letters Patent, as an improvement in journals and boxes, is—

1. Securing the chilled-cast-iron sleeve onto the journal to prevent it from turning, in manner substantially as herein described.

2. Connecting the rollers with the frame in which they turn by means of ball-journals, substantially as described.

3. Relieving the friction due to end play and pressure between the end of the journal and the box by means of the chilled balls and surfaces, substantially as described.

WM. S. MEAD.

Witnesses:
  WM. H. BISHOP,
  ANDREW DE LACY.